United States Patent
Fischer

(10) Patent No.: US 7,124,658 B2
(45) Date of Patent: Oct. 24, 2006

(54) CONTINUOUSLY VARIABLE GEARBOX

(75) Inventor: Herwig Fischer, Poznan (PL)

(73) Assignee: Satellite Gear Systems B.V., Rotterdam (NL)

( * ) Notice: Subject to any disclaimer, the term of this patent is extended or adjusted under 35 U.S.C. 154(b) by 358 days.

(21) Appl. No.: 10/250,560

(22) PCT Filed: Jan. 3, 2002

(86) PCT No.: PCT/EP02/00009

§ 371 (c)(1),
(2), (4) Date: Jun. 30, 2003

(87) PCT Pub. No.: WO02/053949

PCT Pub. Date: Jul. 11, 2002

(65) Prior Publication Data

US 2004/0045383 A1    Mar. 11, 2004

(30) Foreign Application Priority Data

Jan. 5, 2001    (DE)    ............... 101 00 374

(51) Int. Cl.
*F16H 27/00*    (2006.01)
*F16H 29/00*    (2006.01)
(52) U.S. Cl. .................... 74/111; 74/22; 74/63; 74/640
(58) Field of Classification Search ............... 74/22 R, 74/22 A, 63, 112, 117, 122–126, 128, 129, 74/640, 111
See application file for complete search history.

(56) References Cited

U.S. PATENT DOCUMENTS

| | | | | |
|---|---|---|---|---|
| 1,865,839 A | * | 7/1932 | Craig ........................... | 74/63 |
| 3,199,362 A | * | 8/1965 | Pfeiffer ........................ | 476/11 |
| 4,194,407 A | * | 3/1980 | Gogins ........................ | 74/117 |
| 4,326,431 A | | 4/1982 | Stephenson | |
| 4,850,248 A | * | 7/1989 | Korban et al. ................ | 475/14 |
| 5,950,488 A | | 9/1999 | Abdallah | |
| 6,371,881 B1 | * | 4/2002 | Garcia Benitez et al. ... | 475/269 |

FOREIGN PATENT DOCUMENTS

| | | |
|---|---|---|
| BE | 24 020 | 2/1922 |
| DE | 866 288 | 2/1953 |
| DE | 43 17 478 | 3/1994 |
| EP | 0 708 896 | 7/1997 |
| FR | 866 718 | 8/1941 |
| FR | 1 078 473 | 11/1954 |
| FR | 2 257 826 | 8/1975 |

* cited by examiner

Primary Examiner—Richard Ridley
Assistant Examiner—Justin Krause
(74) Attorney, Agent, or Firm—Andrew Wilford

(57) ABSTRACT

A steplessly variable transmission has an input body rotatable about an input-element axis and an output body rotatable about an output-body axis and movable between a position with the axes coaxial and a position with the axes substantially parallel and offset from each other. An annular formation on one of the bodies is centered on the axis of the one body. A plurality of guides rotationally coupled to the other of the body are angularly equispaced about the axis of the other body. Respective control elements displaceable in the guides and angularly coupled to the other body are each displaceable relative to the other body between a torque-transmitting position engaging the annular formation and rotationally coupling the bodies and a no-load position disengaged from and out of contact with the formation. A controller is selectively engageable with the control elements for displacing same between the engaged and disengaged positions.

10 Claims, 3 Drawing Sheets

CONTINUOUSLY VARIABLE GEARBOX

CROSS REFERENCE TO RELATED APPLICATIONS

This application is the US national phase of PCT application PCT/EP02/00009, filed 3 Jan. 2002, published 11 Jul. 2002 as WO 02/053949, and claiming the priority of \German patent application 101100374.9 itself filed 5 Jan. 2001.

FIELD OF THE INVENTION

The invention relates to a steplessly variable transmission with cyclically meshing control elements wherein shifting the positions of the input and output elements from a concentric position into selected eccentric positions produces different angular speeds and thus different transmission ratios between the input and the output elements with the same peripheral speed of the control elements.

BACKGROUND OF THE INVENTION

According to EP 0,708,896 a stepless or nearly steplessly variable, continuous-mesh, planetary-gear transmission is known that has an input element, an output element, and a plurality of separate gears that together form a satellite wheel that is in continuous mesh with a central sun gear. If the relationship of the effective radii of the satellite wheel and the sun gear and the relative eccentric position of the satellite wheel and the sun gear are varied relative to each other by appropriate mechanism, the speed ratio between the input and output elements is correspondingly varied. The gears forming the satellite wheel move cyclically when set eccentrically through a force-transmitting load path and a no-load path, the gears on the one hand orbiting about the satellite-wheel axis and on the other hand being constrained by one-way clutches to only rotate in one direction about their own axes. On transitioning from the no-load path to the force-transmitting path the wheels are blocked and thus transmit the angular force applied to them. Any irregularity in the torque transmission is at least partially compensated out by varying the radii of the force-transmitting path and/or the effective tangential components by a cyclical variation. In an actual embodiment that is described in this reference, the coupling elements are mounted on the periphery of the drive element and can move in different paths established by output-side radial grooves. The coupling elements are here made to mesh via various direction-dependent force and/or mesh effects so that at any time that coupling element transmits the torque that leads to the highest peripheral speed in the output element. Thus the other coupling elements shift automatically to the "passing mode," that is uncoupled. The transmission described in EP 0,708,896 and similar direction-dependent transmissions have the inherent disadvantage that as a result of the automatic shift to freerunning the transmission always produces higher output speeds and cannot produce a ratio giving a lower output speed.

OBJECT OF THE INVENTION

It is therefore an object of the invention to provide a stepless or nearly steplessly variable transmission where both high and low output speeds can be achieved.

SUMMARY OF THE INVENTION

According to the invention in contrast to the prior art a selective controller moves the control elements into torque-transmitting coupling engagement, that is they are not or not always in contact with direction-dependent coupling only when an individual control element exceeds the highest angular speed. The employed means for coupling and decoupling can move the control elements radially or axially relative to the output element.

Preferably the coupling between the control element and the input element, which preferably is a rod (as shaft) or disk, is through a temporary physical connection.

According to a further embodiment of the invention, the control elements are automatically latchingly wedged by a directional controller, the wedging-surface contact for torque transmission from the input element to the output element being effective only in a predetermined angular region for a desired predetermined transmission ratio by the selective controller. Preferably this controlled movement of the control elements is axial.

According to a concrete embodiment of the invention the controller is a control disk that is always concentric to a disk that has radial guides for the control elements. Preferably the control disk controls via radial movement. The mechanical engagement is via Hirth teeth between the control elements and the output element.

In order to compensate for tooth misalignments and shocks resulting from irregularities, the disk is movable elastically radially (to change the transmission ratio) in a groove guide. To further compensate for tooth misalignments and irregularities, in addition to the radial movement of the control elements in a disk, an elastomer permits radial and angular movements between the control elements and the gear or disk.

The coupling procedures are set in motion electromechanically, hydraulically, electrically, magnetically, or via a piezo elements.

Preferably the tooth geometry is selected such that the ratio of the width to the depth of the teeth at all speeds is greater than the ratio of the maximum possible peripheral speed difference in the load path to the speed of the axial shifting of the control elements or the satellites when being coupled.

BRIEF DESCRIPTION OF THE DRAWING

Further embodiments of the invention as well as their advantages are described in the following with reference to the drawing. Therein.

SPECIFIC DESCRIPTION

Figure 1:
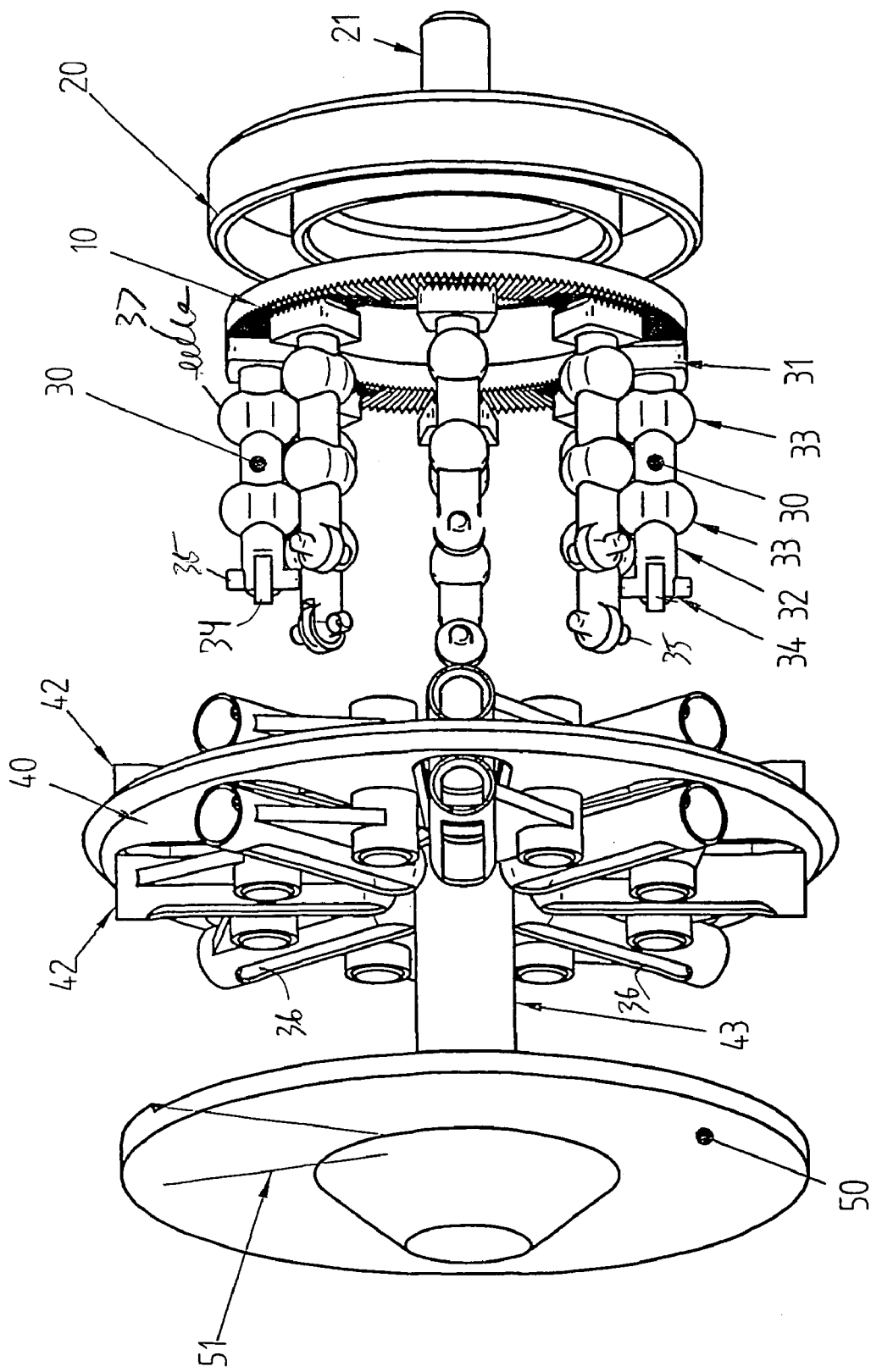
FIGS. 1 and 2 are exploded views of a transmission according to the invention.

The transmission shown in FIG. 1 serves for transmitting torque from a disk 20 equipped with shaft 21 and a gear 10 (as input element) to a disk 40 (as output element), the torque being transmitted by control elements 30 that are selectively moved by a cam disk 50. The input side and the output side are interchangeable.

The disk 40 has on both faces radial guides 42 constituted as radially extending straight tubes and having grooves 36 for pins 35 by means of which undesired twisting of the control elements 30 is avoided. The control elements 30 have toothed heads 31 turned toward the corresponding Hirth-toothed gear 10. The control elements 30 transmit all angular forces to the disk 40 via slide bodies 33 and the radial guides 42. Axial shifting of the control elements 30 as a sliding of pins 32 in the slide bodies 33 couples the heads 31 and the gear 10. The control elements 30 ride via rollers 34 on the ends of the pins 32. The cam disk 50 has a cam 51 that extends for example over an angle of 45° so that when eight control elements are used only one of the control elements 30 is shifted axially by the cam disk 50 at a time to engage with its teeth in the gear 10. When a control element 30 moves off the segment cam 51 it is forced by a schematically illustrated spring 37 and the axial component of the forces on the teeth of the respective head 31 out of engagement with the gear 10.

The cam disk 50 is always concentric with the disk 40. Changes in speed from the input to the output are the result of moving the disk 40 eccentric to the disk 20 or to the gear 10.

In order to ensure smooth transfer of the load from one to another control element 30, compensate for inherent irregularities, and compensate for synchronization problems on engagement of the teeth (head 31 and gear 10), in a preferred embodiment the radial guide grooves 42 on the disk 40 are mounted rotatably and on springs. Preferably the center of rotation lies on the radius that produces a transmission ratio of 1:1. Torque is transmitted via the axle 21 and the disk 20 from the gear 10 to the transmission output; the transmission can also be oppositely driven with the input and output switched. In the illustrated and above-described embodiment any desired transmission ratio can be set including ratios giving very small transmission angular speeds.

It is also possible within the scope of the present invention to mount the teeth flanks of the control elements 30 via elastomeric cushions on the shafts of the control elements 30 such that tooth misalignments on interengagement are compensated for by elastic movements. If such elastomeric cushions also allow radial movements, there is in addition an improvement in the inherent irregularity of the transmission. In another variant the relative movements permitted by the cushions are limited by end stops so that the elastomer is not overloaded by peaks of angular force.

As an alternative to the continuous coupling via the Hirth bodies formed by the gear 10 and heads 31 it is also possible to achieve a solid coupling similarly by use of a known sprag-type free-running clutch.

Figure 2:
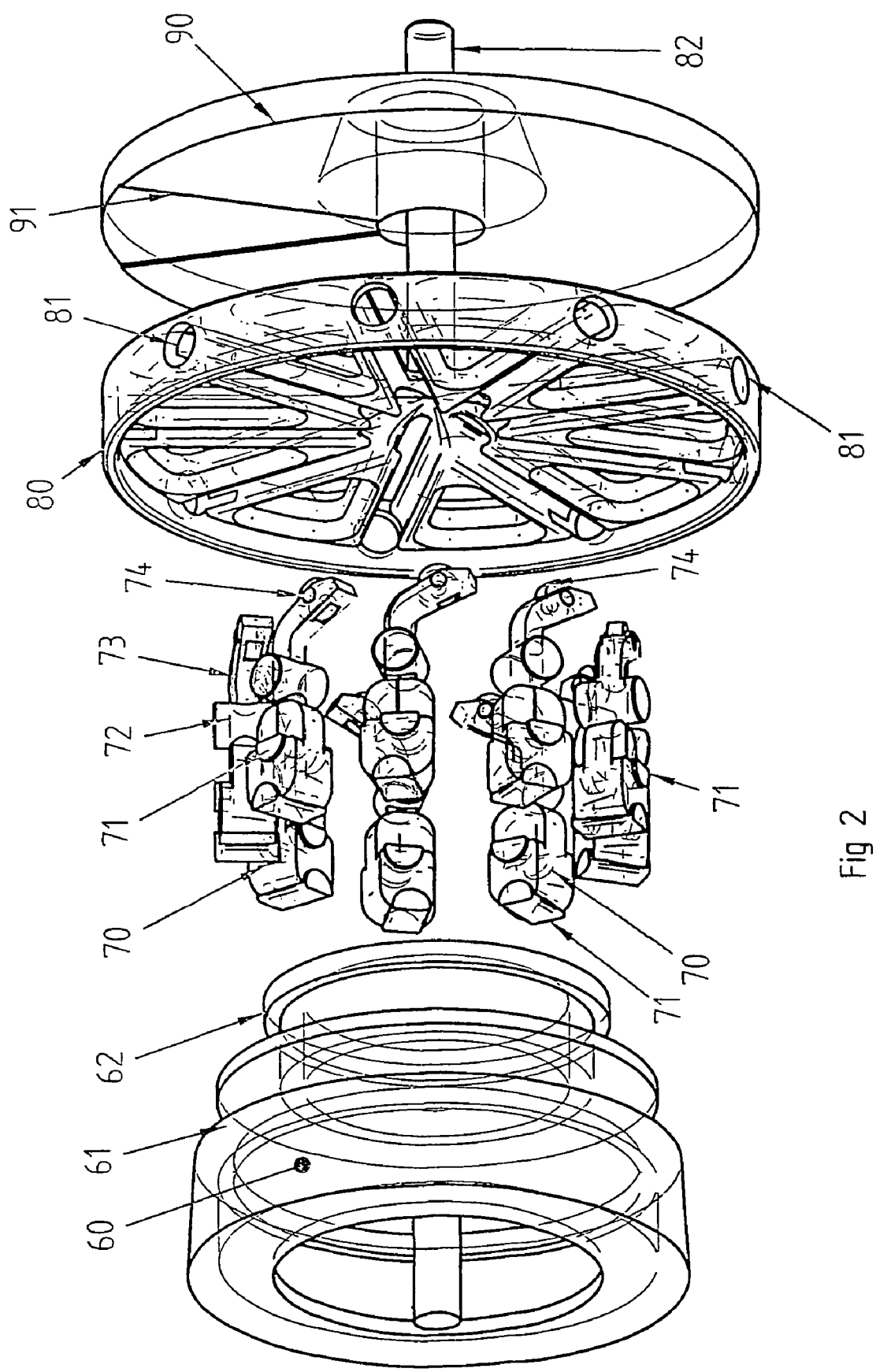

FIG. 2 shows control elements 70 having wedge blocks 71, slide blocks 72, and bent shafts 73 on which rollers 74 are mounted. The slide blocks 72 can move radially and also rotate in grooves 81 so that the control elements 70 can tip such that the wedge blocks 71 engage flanks 61 and 62 of an annular disk 61 and are wedged by the torque-transmitting angular forces on the slide blocks 72 so that the applied torque is transmitted. When slipping the angular force is oppositely applied to the slide blocks 72, the tipping moment is negative, and the wedging action is no longer present. An unillustrated spring holds the wedge blocks 72 when sliding. The bend at the end of the shaft 73 and the rollers 74 create as they roll on the cam disk 90 an additional tipping movement of the control elements 70 that raises the wedge blocks 71 against the spring force out of wedging contact so as to let them slip. On passing the circularly segmental groove the free-running action of the control elements 70 is initiated, the forced control is ended, the wedge blocks 71 are pushed into wedging contact by their springs, and a torque-transmitting angular force is produced. In this manner on the one hand the free-running action is used to latch the control elements 70 since with the right shape a wedging action is produced in that the perpendicular forces for producing frictional engagement are automatically increased with the applied angular force so as to guarantee a slip-free coupling, and on the other however this prevents that only the fastest control element 70 is effective so that only high transmission output speeds are possible. It is also possible in the scope of the present invention to modify the disk 80 such that the angular forces are cushioned as in the disk 40 (FIG. 1).

Figure 3:
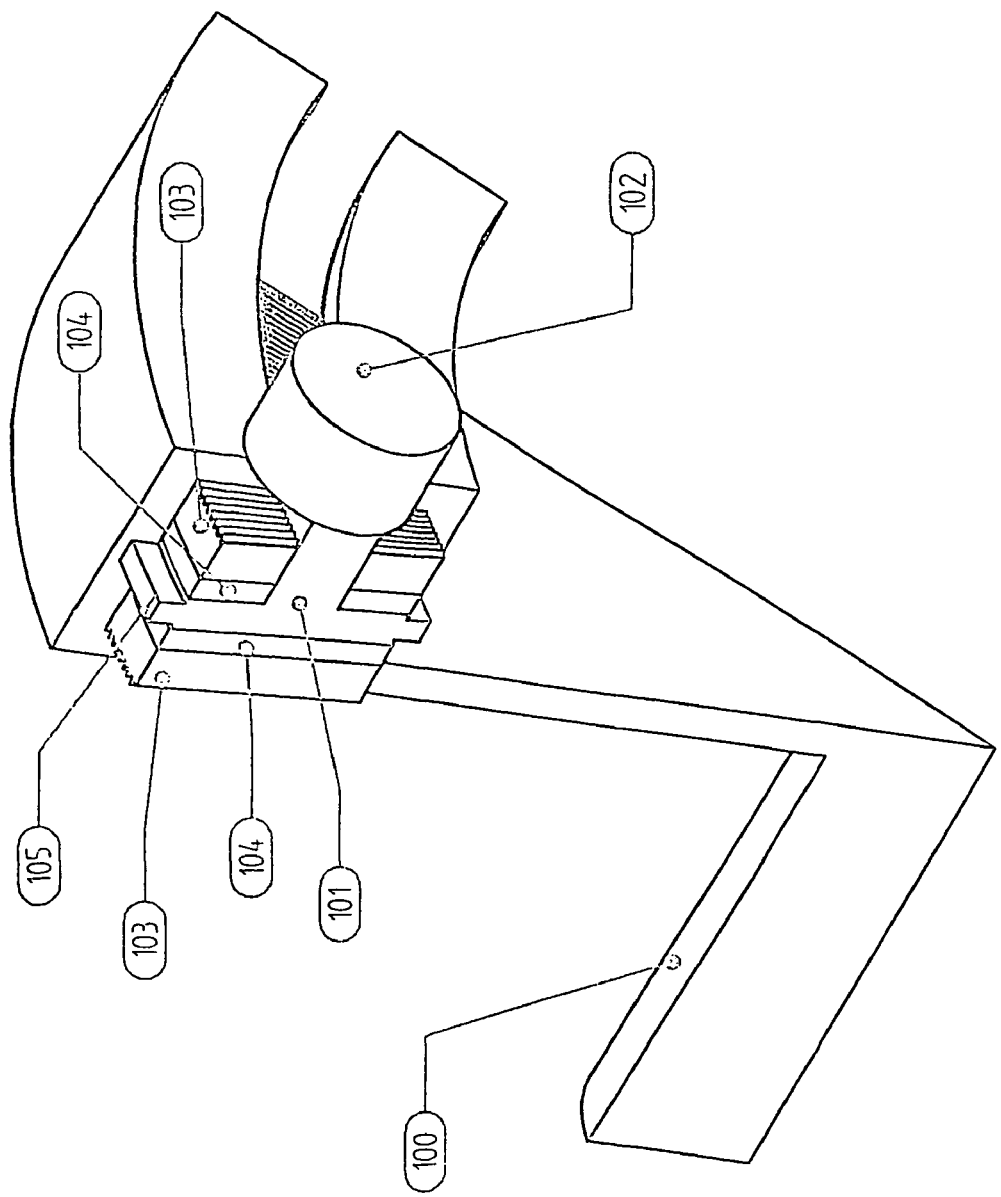
FIG. 3 is a partial view of a further satellite drive according to the invention.

FIG. 3 shows an embodiment of a couplable drive with an annular disk 100, of which only a segment with axle and ring edge is shown and which has teeth in a guide channel. A satellite 101 is held in the illustrated guide shape 105 in the center of the annular disk 100. An intermediate layer 104 is made thicker or thinner by a piezo-effect so as to press the toothed segment 103 into the teeth of the annular disk 100 or pull it out of these teeth. In this manner is the coupling action initiated and torque transmitted between the annular disk and the satellite and from there via the carrying pin 102 into a star disk or, according to setup, oppositely from the star disk into the satellite and thence to the ring disk. In order to increase the height of the piezo-element 104 and make a larger coupling stroke possible, in another variant the intermediate layers are extended into the force-transmitting pin 102.

Instead of a piezo-stack in another variant the force-transmitting pin 102 is formed as hollow cylinder and a piston inside it is moved hydraulically or pneumatically such that the teeth are coupled or uncoupled. Control of the coupling action takes place preferably via a slotted disk in the hydraulic system that is permanently pressurized and aligns with the rotating region, that is the load path, so that as the slot is passed the hydraulic pressure is effective.

The force production of the coupling movement corresponding to the embodiment of FIG. 3 can also be done electromagnetically or magnetically.

In order to avoid a kinematic locking-up of the transmission caused by the fact that on the one hand the ratio produced by two satellites is identical only over a small finite angular path and on the other hand however the coupling action cannot be effected instantaneously, the shape of the teeth is selected such that the ratio of tooth width to tooth height for the selected Hirth teeth at all speeds is larger than the ratio of the maximum possible rotation speed difference in the load region to the speed of the axial movement of the satellites during the coupling operation.

Further discussions of the shape of the wedge blocks 71 can be found in EP 1,003,984 at FIGS. 13 to 16 as well as the corresponding parts of the description.

The invention claimed is:
1. A steplessly variable transmission comprising:
an input body rotatable about an input-element axis;
an output body rotatable about an output-body axis and movable between a position with the axes coaxial and a position with the axes substantially parallel and offset from each other;
an annular formation on one of the input body and the output body and centered on the axis of the one body;
a plurality of guides rotationally coupled to the other of the input body and the output body and angularly equispaced about the axis of the other body;
respective control elements displaceable in the guides, angularly coupled to the other body, and each displaceable relative to the other body between a torque-transmitting position engaging the annular formation and rotationally coupling the bodies and a no-load position disengaged from and out of contact with the formation; and a controller selectively engageable with the control elements for displacing same between the engaged and disengaged positions.

2. The transmission defined in claim 1 wherein the annular formation is an annular array of teeth and the control element has a head formed with axially directed teeth complementary to and meshable with the teeth of the formation.

3. The transmission defined in claim 1 wherein the annular formation is an annular row of Hirth teeth, the control elements having toothed heads engageable axially with the teeth.

4. The transmission defined in claim 1 wherein the annular formation is a groove and the control elements are tippable between the engaged and disengaged positions and are dimensioned so as to wedge in the groove when tipped.

5. The transmission defined in claim 1 wherein the annular formation is a groove and the control elements have heads engaged in the groove and expandable to wedge in the groove in the engaged position.

6. The transmission defined in claim 5 wherein the heads each have a swellable piezo part electrically energizable to change dimension, whereby when the piezo part is swollen the respective head is wedged in the groove.

7. The transmission defined in claim 1 wherein the control elements are movable axially between their engaged and disengaged positions.

8. The transmission defined in claim 7 wherein the controller is angularly fixed the other of the input body and the output body.

9. The transmission defined in claim 8 wherein the controller is a cam disk bearing axially on the control elements.

10. The transmission defined in claim 9 wherein there are a predetermined number n of the control elements and the cam disk has an axially raised cam of an angular dimension equal to about 360/n°, whereby only one of the control elements is shifted by the cam into the engaged position at any given time.

* * * * *